(12) United States Patent
Sullivan

(10) Patent No.: US 6,876,992 B1
(45) Date of Patent: Apr. 5, 2005

(54) METHOD AND SYSTEM FOR RISK CONTROL OPTIMIZATION

(75) Inventor: Anthony F. Sullivan, Conklin, MI (US)

(73) Assignee: Willis North America Inc., Nashville, TN (US)

(*) Notice: Subject to any disclaimer, the term of this patent is extended or adjusted under 35 U.S.C. 154(b) by 596 days.

(21) Appl. No.: 09/722,574

(22) Filed: Nov. 28, 2000

(51) Int. Cl.[7] .............................................. G06N 5/00
(52) U.S. Cl. .......................................... 706/47; 703/2
(58) Field of Search .............................. 703/2; 706/47; 705/8; 37/348

(56) References Cited

U.S. PATENT DOCUMENTS

| | | | | |
|---|---|---|---|---|
| 5,553,407 A | * | 9/1996 | Stump .......................... | 37/348 |
| 5,615,109 A | * | 3/1997 | Eder .............................. | 705/8 |
| 5,832,456 A | * | 11/1998 | Fox et al. ..................... | 705/10 |
| 6,473,084 B1 | * | 10/2002 | Phillips et al. .............. | 345/440 |
| 6,477,520 B1 | * | 11/2002 | Malaviya et al. ............ | 706/47 |
| 6,578,068 B1 | * | 6/2003 | Bowman-Amuah ......... | 709/203 |
| 6,606,615 B1 | * | 8/2003 | Jennings et al. ............. | 706/45 |
| 6,792,399 B1 | * | 9/2004 | Phillips et al. ............... | 703/2 |

\* cited by examiner

Primary Examiner—Wilbert L. Starks, Jr.
(74) Attorney, Agent, or Firm—Birch, Stewart, Kolasch & Birch, LLP

(57) ABSTRACT

A method and system for selecting an optimal set of management and risk controls for a given set of risks within a variable control budget. Specifically, optimization according to the present invention is defined using a method and system to calculate the greatest reduction in an organization's risk exposure with the minimum investment in cost and time as measured by the economic value added of the risk system change. Risk control models and management risk control models are client customized into a risk control system specifically addressing a clients applicable risks and their associated exposures. An operator is able to determine which risk control system maximizes available resources while also reducing an organization's total risk exposure.

24 Claims, 8 Drawing Sheets

Optimization of A Selection of Risk Controls

Inputs

People

Materials

Facilities

Procedures

Environment

Outputs

Customers

Optimization of A Selection of Risk Controls

Identifying and Measuring Risks (200)

Optimization of Control System within Given Budget (400)

Optimization of Control System and Budget (500)

METHOD AND SYSTEM FOR RISK CONTROL OPTIMIZATION

FIELD OF THE INVENTION

The present invention is directed to a method and system of selecting an optimal set of management and risk controls for a given set of risks within a variable control budget. Specifically, optimization according to the present invention is defined using a method and system to calculate the greatest reduction in an organization's risk exposure with the minimum investment in cost and time as measured by the economic value added of the risk system change.

BACKGROUND OF THE INVENTION

Organizations exist for a purpose. They have a vision, goals and specific objectives aimed at achieving the goals and realizing the vision. Risks are those factors that jeopardize the achievement of the organizational objectives, goals, or vision—that create uncertainty that the desire results will be achieved. Organizations must identify risks that put their objectives in jeopardy and deploy controls to reduce the risk exposure.

Risks are created by underlying hazards. Risk is the measure of the uncertainty in both time and severity that a hazard will cause a loss. The proper measure for risk is exposure, which is the product of the probability of the loss and the severity of the loss. Since risk is a stochastic phenomena, the best representation of risk is a loss distribution function showing the probability of various severities of loss.

FIG. 1 shows a sample risk distribution for a single hazard. The total risk is equal to the area under the curve, the sum of all the individual probabilities(Likelihood) times severity(Size of single loss). Risk controls operate to reduce the area under the curve. However, these risk controls have an associated cost. In an ideal world the resources available for risk control are infinite and risks can be reduced to zero. In the real world, resources are limited. The risks can only be reduced to zero by abandoning the objective and a balance must be struck between the "good" to be achieved and the cost of risk controls and potential loss from the residual risk (risk remaining after risk controls are applied).

Furthermore, realization of the organizational vision requires the achievement of numerous objectives, all exposed to a vast number of different risks that need to be managed by a complex array of risk controls. Currently, most organizations manage these risks utilizing disconnected processes that are controlled by different functional areas within the organization. Evaluation by the organization's senior management of the efficiency and effectiveness of these various risk management efforts is hampered by at least two shortcomings.

Management is hampered by the lack of consistent methods for (a) identifying and measuring the risk exposures and (b) measuring the performance of the associated risk controls. This makes it extremely difficult for the organization to set priorities and to achieve an optimal allocation of resources toward risk control across the entire enterprise. This failure to establish an integrated enterprise-wide risk management system exposes an organization to two potentially dire consequences.

First, a major risk may be overlooked that will prevent the achievement of the organization's objectives. Second, resources will be wasted on inefficient and/or ineffective risk control efforts.

One of the necessary and primary objectives of any organization is that economic value be added. The organization's efforts need to create additional economic value or the organization will eventually exhaust its capital and wither away without having realized its vision. This is true of all organizations whether they be private or public corporations or non-corporate organizations.

One measure of economic performance is Stern Stewart & Co.'s Economic Value Added (EVA™) methodology. The basic theory states that economic value is added when future revenue cash flows exceed the expense and capital cash flows necessary to produce the revenue, more simply stated:

EVA™=Operating Profit (OP)−Cost of Capital (CC), where Cost of Capital (CC)=Capital×Cost of Capital Rate (C*)

Operating Profit can be further broken into two components:

Operating Profit (OP)=Operating Revenue (OR)−Operating Expense (OE)

So that the Economic Value Added (EVA) becomes:

$$EVA^{TM} = (\text{Operating Revenue} - \text{Operating Expense}) - (\text{Capital} \times C^*)$$
$$= (OR - OE) - (\text{Capital} \times C^*)$$

The aforementioned methodology requires that all of the cash flows should be adjusted for taxes, time and risk. The EVA™ methodology was originally developed as a performance metric for explaining the valuation of public stocks. Stern Stewart & Co. has further expanded its application as a guide for large-scale resource allocation when considering "profit center" investments and as the basis for tying management compensation to increases in shareholder value.

Before an organization can evaluate the performance of risk controls it must first identify and measure the risk exposures. This is a large, complex task, since organizations are faced with a huge number of hazards that generate varying degrees of risk exposure. Organizations generally divide responsibility for various risks among different functional groups within the organization in order to manage these risks.

The basis for the distribution of the responsibility varies from organization to organization and within the same organization. In many instances a functional group will be responsible for managing the risks that jeopardize the operations that they are responsible for. An example is the responsibility of the treasurer for the foreign currency exchange risk. In other instances a manager will have responsibility for risks that span across multiple functional areas where the manager does not have responsibility for the underlying operations. An example is the environmental manager whose is responsible for managing the environmental risks across the entire organization. Frequently responsibility is shared for various portions of the basic risk management process even if the distribution of responsibility is not well defined. FIG. 2 shows a basic risk management process of the related art.

Due to the historical distribution of responsibility for managing risks to isolate functions, the methodologies developed for the identification and measurement of risks vary greatly in their design, assumptions and outputs. Often management of the risks is performed using arcane technical language that varies from one functional area to another. Although the managers of these various risk are generally aware that the risk exposure has a probability and a severity component, they rarely use exposure to measure the risks and even more rarely use loss distribution functions to define the risk exposures.

Normally the manager considers the issues of probability and severity separately. Accordingly, sufficient data to define the loss distribution function is rarely available. This makes it extremely difficult for organizations to place consistent valuations on the risks and subsequently to determine how to optimize the allocation of resources across the entire enterprise. Frequently resources are allocated based upon either (a) Historical happenstance, i.e. the organization is aware of a recent large loss that increases its sensitivity to the risk associated with a particular hazard; or, (b) The organizational strength of the manager, i.e. a strong manager gathers more resources within the organization.

More sophisticated managers use various subjective ranking systems to order the relative severity, probability and control cost. Labels are attached to each hazard indicating a subjective valuation of the severity and probability. For example severity may be ranked as "high", "medium", or "low". Probability may be ranked as "certain", "likely", "unlikely", or "rarely". The cost to control the risk is similarly ranked as "high", "moderate" or "low". A few of the ranking methodologies attempt to apply across all risks in the organization, but without establishing consistent operational definitions and measurement methodologies across the various functional areas. "High" and "Likely" frequently mean different things to different people. These methodologies also do not recognize the interdependencies that exist between various risk controls, nor do they tie back to the question of whether economic value is being created by the risk control efforts.

A few organizations use sophisticated mathematical analysis to define loss distribution functions for risks within a particular functional area. These efforts, however, are restricted to a handful of risks due to the effort to rigorously define the loss distribution functions. Currently there are a number of historical forces at work that are moving organizations toward a more systematic management of risks across the entire enterprise. Broadly speaking these are:

The Corporate Governance movement,

COSO's (Committee of Sponsoring Organizations) Internal Control—Integrated Framework, The 1991 Federal Sentencing Guidelines for Organizations, The Imperatives of World Class Performance Under the Stern Stewart & Co. methodology, a company will often allocate resources to activities that produce the greatest EVA and will reward those managers who generate EVA. Activities and managers, who do not produce EVA, will be easily identified and will provide a company with the opportunity to free up capital and direct it towards those who utilize it most effectively.

EVA analysis was first applied to decisions regarding investments in the context of "profit centers." For instance, managers are now asked in advance to evaluate the efficacy (i.e. does the activity produce positive EVA) of expanding production capacity for a particular product line? Similarly, EVA is now being applied to "cost centers" as well. Managers of "cost centers" are being asked to justify new activities or even the existence of their function on the basis of EVA.

At first glance this may seem difficult because by definition a "cost center" does not generate revenue and it would appear that only a reduction in the operating expense and capital requirements to zero would improve the situation. According to the EVA methodology, the best result that can be achieved with respect to a cost center is a reduction in its negative impact on EVA. Therefore, a cost center or activity lacking revenue generating capabilities, would seemingly lack the ability to achieve a positive EVA.

For example, consider the annual cost of preventative maintenance on a piece of machinery. The expenditure of capital to maintain the piece of machinery does not produce new revenue nor does it decrease the operating expense. Therefore, the conventional EVA methodology teaches that managers should evaluate the impact of preventative maintenance activities on EVA as producing a negative result. However, it appears that the wrong questions are being asked in the evaluation of the Economic Value Added.

The division of a productive system into "profit" and "cost" centers is an arbitrary allocation of operating revenues to only a portion of the system that is required to produce and sell the product or service to the customer. For example, the evaluation of an investment in a new piece of machinery reveals the following:

(1) An initial capital outlay either produces a new revenue stream with a given operating cost over the life of the machine, or (2) The initial capital outlay replaces an existing revenue stream at a reduced operating cost or (3) A combination of the two.

In either case, one must be careful to capture the total operating expense over the lifetime of the machine. In order to capture the total operating expense over the lifetime of the machine, an accurate evaluation should include the preventive maintenance cost necessary to keep the machine productive over its expected lifetime.

Cash flows equally need to be adjusted for risk. However, methodologies and systems of the background art fail to provide a single system that offers the operator or manager the ability to accurately assess the Economic Value Added of all activities within an organization.

For instance, cost allocation and activity-based costing are additional examples of accounting systems that assign or link some cost(s) with related cost objectives. Salaries for a group of employees in an operating unit are indicative of costs (salaries) associated with the maintenance of a cost objective (the operating unit). Similarly, raw materials costs are often assigned or allocated to a product or group of products (cost objective). However, as in all of the foregoing examples, the preventative maintenance costs associated with a machine in an manufacturing process would be considered "negatives" under all of the previous approaches.

SUMMARY OF THE INVENTION

The present invention overcomes the shortcomings associated with the approaches of the prior art and achieves other advantages not realized by the prior art.

An object of the present invention is to provide organizations with a method and system for consistently identifying and measuring risks across the entire enterprise or any subpart of the enterprise.

A further object of the present invention is to provide organizations with a method and a system for identifying potential controls for any given set of identified risks.

A further object of the present invention is to provide a method and system for evaluating the economic value added of risk controls.

A further object of the invention is to provide organizations with, a method and system for selecting risk controls, setting control priorities, and establishing an optimal control budget so that the economic value added is maximized.

An object of the present invention is to integrate management controls and risk controls into a single system or methodology that will provide managers or operators with a tool to most efficiently allocate an organization's resources.

These and other objects are accomplished by a method for optimizing a selection of risk controls based upon maximizing the economic value added within a client's given risk control budget, wherein said method comprises the following steps: identifying and measuring risks; creating at least one risk control system based upon said risks; determining the economic value added of each risk control system; and selecting an optimal risk control system that has a maximum economic value added based upon the determining step.

These and other objects are further accomplished by a computer-based data processing system to enable an operator to create a risk control system providing a maximum economic value, wherein said system comprises: means for storing risk models, wherein said risk models include risks and corresponding risk exposures; means for storing specific risk control models further classified and arranged by at least industry type, organizational structure, and functional segments within each industry type; means for storing management risk control models further classified and arranged by at least industry type, organizational structure, and functional segments within each industry type; means for developing risk control systems by combining said specific risk and management risk controls into at least one client specific risk control system; and means for determining an optimum risk control system by calculating an Economic Value Added (EVA) of each client specific risk control system so that said operator can select the optimum risk control system that demonstrates a maximum Economic Value Added (EVA).

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus do not limit the present invention.

DETAILED DESCRIPTION OF PREFERRED EMBODIMENTS

Figure 3:
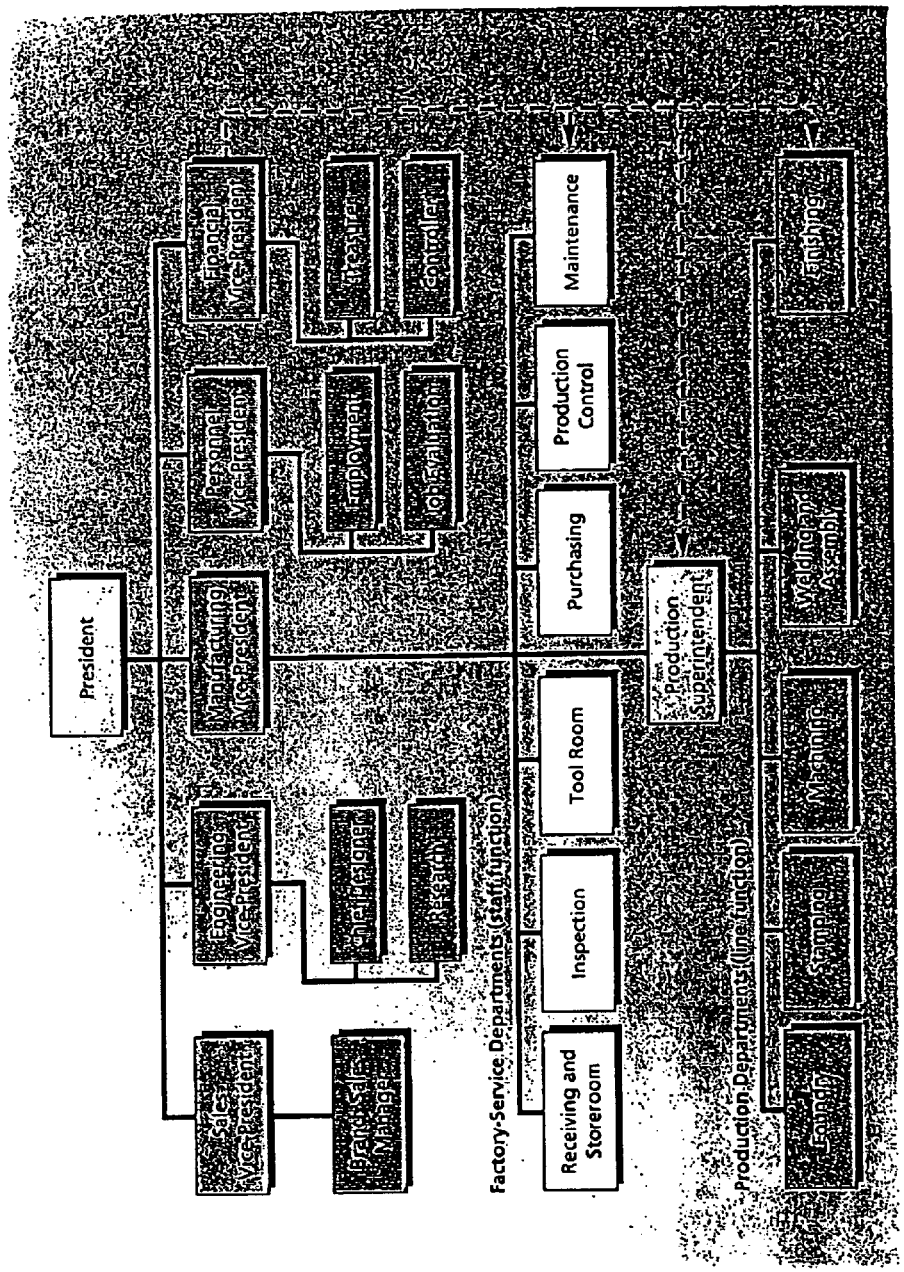
FIG. 3 is an organizational chart of a typical manufacturing company.

FIG. 3 shows a partial organizational chart of a manufacturing company. Each department of the company is further broken down into activities or functional segments. The maintenance department within the factory-service department of the company would be involved in daily activities that affect the performance of each of the remaining departments. However, many systems in the background art would focus on the decisions and budget of the maintenance department as primarily being a "cost center."

The present invention provides a method and system that effectively calculates what the economic value added is of individual activities and processes throughout the entire organization, such as the maintenance department. The present invention provides the specific utility of integrating management and risk controls, whether applied by the president or the manager of the maintenance department, into a single system that can be applied to the individual functional segments (i.e., toward an individual maintenance procedure). The results are indications of the economic value added of each activity, process, or department that operates within the company's organizational structure.

EXAMPLE #1

Deriving EVA for a Safety System

As seen in the following example of the present invention applied toward an individual machine in a manufacturing process, the present invention provides an opportunity to calculate the real economic value added to a company and directly/indirectly resulting from the allocation of resources toward an activity. For instance, without preventive maintenance efforts, the expected lifetime of a machine is shorter and the probability that the expected revenue will be achieved is less. As discussed with respect to the background art, an evaluation of the cash flows without consideration or alleviation of risk produces estimates that are likely to be inaccurate.

The EVA impact of preventative maintenance can only be answered as part of a larger question involving the original investment in the machine. Similarly, the capital resources expended to maintain a safety management program are analogous to the capital expended on preventative maintenance. The whole question of safety efforts and EVA are more properly part of a larger question concerning the EVA calculation on the productive system in which the investment was originally made.

Employees or producers are additional necessary assets in a productive system. The protection of these productive assets is a necessary operating expense as well that would likely be viewed as a cost center without the possibility of generating a positive EVA.

It is often helpful when examining a productive system to focus on a particular set of processes and treat those processes as an "independent" subsystem that provides inputs to the rest of the productive system.

Figure 1:
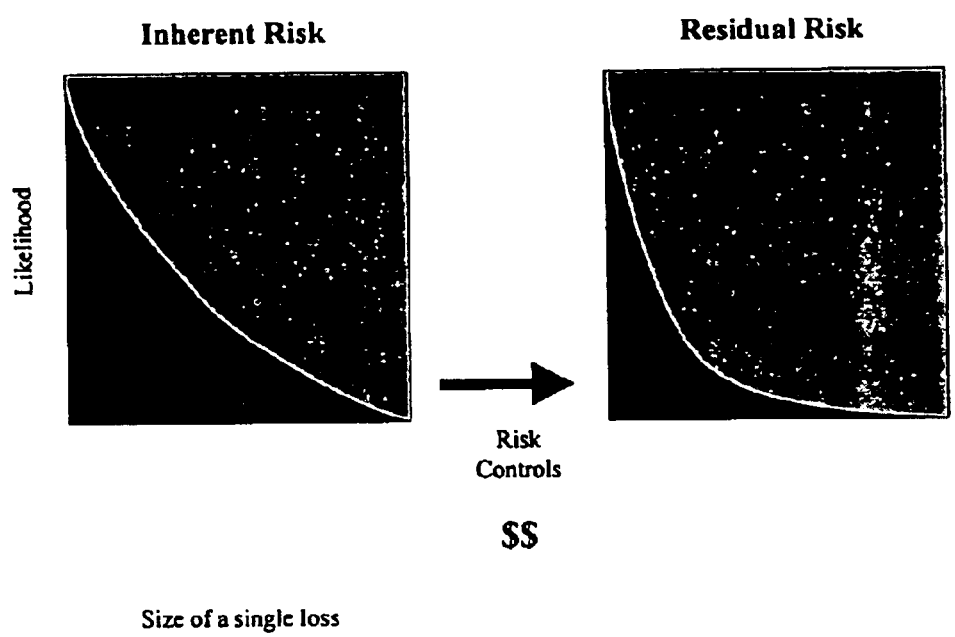
FIG. 1 is a graphical representation of a sample risk distribution for a single hazard and the resulting effects of risk controls.
Figure 2:
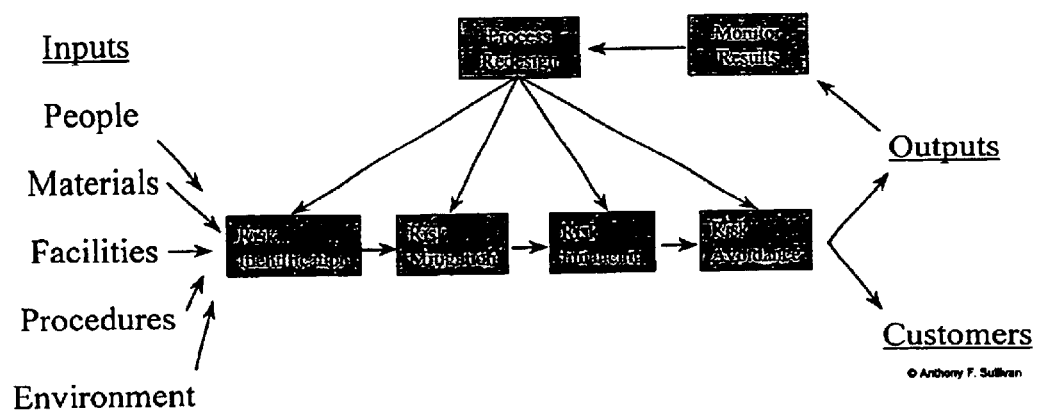
FIG. 2 is a basic block diagram depicting a basic risk management process found in the related art.

Examples in a typical organization, as seen in FIG. 2, include the maintenance department and its preventative maintenance program; the purchasing department and its system for procuring raw materials; the human resource department (Personnel) and its hiring processes; and the safety/inspection department and its safety system. However, each of these subsystems, despite their individual characteristics and requirements, is not truly separate from and "independent" of the total productive system.

When analyzing the safety system as an "independent system", it is important to capture all of the cash flows in both the safety system and the productive system. Due to the lack of safety management, a certain level of anticipated operating expense for workers compensation, lost production efficiencies and governmental fines over the lifetime of the productive system, must be factored into the base EVA calculation for a productive system.

We can then evaluate the EVA impact of establishing a safety system by examining the impact of the system upon the base operating expense of the "non-safety managed" productive system versus the "safety managed" system. The EVA of the safety management system is the reduction in the productive system operating expense minus the cost necessary to implement the safety management system.

Considering the basic EVA formula:

$$EVA = (OR - OE)_{AT} - CC$$

OR=Operating Revenues
OE=Operating Expenses.
AT—Indicates that the calculation of Net Operating Profit must be adjusted for taxes $$CC = \text{Cost of Capital} = \text{Capital}(C) \times \text{Capital Rate}(C^*)$$

Note that the cost of the investment shows up in two areas, OE & CC. A capital expenditure will have a depreciation component in OE and a cost of capital component in CC. However, this is not a double accounting. The capital is consumed over a period of time and allowance for its replacement is provided by the depreciation component. The true cost of the capital is the blended cost of debt and equity.

A breakout of the EVA factors associated with a Safety System will aid in considering the impact of the Safety System on the Total Productive System. The superscript "P" designates cash flows associated with the total Productive System and the superscript "S" designates cash flows associated with the Safety System in the following formulas demonstrating the effects of the Safety System on the Total Productive System:

$$EVA = ([OR^P + OR^S] - [OE^P + OE^S])_{AT} - [CC^P + CC^S]$$

Since the only subsystem that generates changes in revenue is Sales, one can set the Total Revenue, TR, equal to $[OR^P + OR^S]$, as a constant.

$$EVA = (TR - [OE^P + OE^S])_{AT} - [CC^P + CC^S]$$

The next step is to measure the cost of the current safety (cs) system ($OE^S_{CS}$ & $CC^S_{CS}$). The "CS" subscripts denote cash flows associated with the current safety system; the "NS" subscripts denote cash flows associated with the productive system without the safety system; and the "I" subscripts denote cash flows associated with improvements to the safety system.

Next, the safety risk cost of the productive system being served by the current safety program ($RC^P_{CS}$) is measured. The safety risk cost of the productive system without the safety program ($RC^P_{NS}$) is then estimated. However simplified these steps may appear conceptually, one of ordinary skill in the art will appreciate that this is not a trivial exercise.

The ΔEVA ($\Delta EVA^{CS}$) of the Current Safety System is the difference between the Productive System EVA without a Safety Subsystem ($EVA^P_{NS}$) and the Productive System EVA with the current Safety Subsystem ($EVA^P_{CS}$), in summary the $\Delta EVA^{CS}$ is defined by:

$$\Delta EVA^{CS} = (EVA^P_{CS}) - (EVA^P_{NS})$$

The productive operating expense can then be separated into the Risk Cost component ($RC^P$) and all other operating expenses ($AOE^P$)

$$EVA^P cs = (TR - [AOEPcs + RCPcs + OEScs])^{AT} - [CC^P cs + CC^S cs]$$

$$EVA^P ns = (TR - [AOE^P ns + RC^P ns]AT - [CCPns])$$

wherein $OE^S ns$ & $CC^S ns = 0$
Since the only impact on the cost of capital of adding a safety system is the addition of the capital cost of the safety system, $CC^P cs = CC^P ns$. Therefore $$\Delta EVA^{CS} = ([AOE^P ns - AOE^P cs] + [RC^P ns - RC^P cs] - OE^S cs)_{AT} - CC^S cs$$

$AOE^P ns - AOE^P cs$=Improvements in the Productive System Efficiencies, due to the introduction of better work methods and/or equipment to prevent injuries. We frequently find such improvements when introducing ergonomic improvements.

$RC^P ns - RC^P cs$=Reductions in the Risk Cost. This would include reduced workers' compensation cost incurred for injured employees, reducing lost productivity efficiencies for injured employees on restricted duty and replacement workers and avoidance of fines that would be incurred in the absence of a safety system.

$OE^S cs$ and $CC^S cs$ are the total cost of the safety system. Since a decrease in the expenses results in an increase profit, thus an increase tax, we can make the tax adjustment by multiplying the expense adjustments by (1−Corporate Tax Rate). The final formula for safety $EVA^S$ is:

$$\Delta EVA^{CS} = \{(([AOE^P ns - AOE^P cs] + [RC^P ns - RC^P cs] - OE^S cs) \cdot (1 - CTR)\} - [C^S cs \cdot C^*]$$

Similar reasoning shows that the ΔEVA for safety improvements is:

$$\Delta EVA^{IS} = \{([AOE^P cs - AOE^P is] + [RC^P cs - RC^P is] - OE^S is) \cdot (1 - CTR)\} - [C^S is \cdot C^*]$$

where
$[AOE^P cs - AOE^P is]$ is the efficiency gain in the general productive system,
$[RC^P cs - RC^P is]$ is the reduction in risk cost,
$OE^S is$, is the annual operating expense required for the safety improvement,
CTR is the corporate tax rate,
$C^S is$ is the capital cost of the safety improvement and
$C^*$ is the cost of capital rate,
In summary, the change in EVA associated with an improvement in the safety system is equal to
Any improvements in the productive system efficiencies, plus
The reduction in risk cost, minus
The expense cost of the safety improvement,
All adjusted for tax, minus
The cost of capital for any capital cost associated with the safety improvement.

EXAMPLE #1

Economic Value Added of Changes to a Safety System

As an example consider a change in work layout and the addition of lift tables to control a material handling risk on an assembly line.

If the assembly line generates $10,000,000 in sales per year.

Operating profit is $500,000.

Materials and Supplies cost $4,500,000.

Labor costs are $3,500,000. Safety Risk Costs are $500,000.

Other GA&O are $1,000,000.

The corporate tax rate is 0.38 and the cost of capital rate is 0.095

The work layout redesign and lift tables have a capital cost of $200,000 and an expected lifetime of five years. $40,000 in annual depreciation and $CC^S is = \$200,000 \times 0.095 = \$19,000$ (cost of capital of the improvements).

There is an 80% probability that the safety improvements will reduce the safety risks costs by $200,000 per year, resulting in a $160,000 reduction in exposure (Probability of Success×Risk Costs=0.80*200,000).

In addition we expect a 5% reduction in labor cost because of the improved layout and ease of handling materials equal to $175,000.

Accordingly, to calculate the $\Delta EVA^{IS}$ for the expected five year lifetime of the investment we layout the EVA cash flows for each of the five years.

$$\text{Year One } EVA = [\$175{,}000 + \$160{,}000 - \$40{,}000] \times .62 - \$19{,}000$$
$$= \$163{,}900$$

Year Two EVA=$163,900
Year Three EVA=$163,900
Year Four EVA=$163,900
Year Five EVA=$163,900

The net present value of these cash flows using a 9.5% discount rate is $629,328.27.

Therefore, the $\Delta EVA^{IS}$=$629,328.27, and if the stock price earnings ratio is 21, then the Market Value Added (MVA) is $13, 215, 894.

Optimizing the Economic Value Added of Risk Controls

The present invention involves a methodology for selecting a set of risk controls that provides the optimal economic value added for a given control budget. The present invention relies on the following unique combination of features to produce a risk optimization method, system, and software that maximizes the economic value added of each functional segment of an organization:

Risk Identification and Quantification

One aspect of the present invention provides assistance in identifying risks at multiple levels of an organization from an organization-wide analysis to a narrowly focused study of specific functional area such as environmental or treasury risk. The present invention provides exposure benchmark data to assist in quantification of the risks for clients or organizations that have not attempted similar analysis in the past. This is accomplished by the pre-development of risk models according to various business classes and functional segments. For instance, risk models for a variety of safety measures common within the paper manufacturing industry can be created, stored and reapplied across multiple organizations or departments within the same industry group or class.

Management System Support

A management system approach to risk that greatly enhances control effectiveness and reliability is further integrated into the present invention. This enables senior management to develop a proactive strategy designed to facilitate organizational goals, rather than respond in a reactive mode to demands from an outside party such as an insurance company or government agency. The approach is in conformity with the COSO framework and various governmental standards regarding risk management.

Client Customizable

Any of the risk or management models developed or applied in the present invention, must allow client interaction, editing, and customization. This allows a client or manager the ability to define critical "value" parameters and to customize the risk and control model to fit their unique culture and situation. This is especially important as risk/management control models proposed in the present invention may be generic to the industry type or business class. By allowing the client or individual manager to structure their risk management system according to their own prioritized goals and experiences, the present invention will permit risk models that most accurately represent the unique characteristics of each organization or company.

Classification of the Client Market

The risk modeling and risk control optimizing methodology is designed so that it can meet the needs of many different segments of the client market. There are at least four ways of segmenting the client market that are useful for evaluating client demand:

Industry class—the system allows a client/operator to model risks and their associated control sets for different industry classes, such as general manufacturing, healthcare, transportation, telecom, utilities, etc.

Client size/complexity classes—The client market can be further divided based upon market size or revenue. For instance, the client market can be divided into four (or more broadly or narrowly if desired) size/complexity segments, which are roughly categorized by their sales value:

1. Major Risk Management (>$5 billion)
2. Risk Management ($1–5 billion)
3. Middle Market ($0.25–1 billion)
4. Commercial lines (<$0.25 billion)

Client Internal Organizational Customers—the system also allows an operator to structure/modify individual risk models so that they meet the needs of different customer segments within a client's organization. These customer segments might include A Board of Directors, Internal Auditors,ExecutiveManagement,ChiefComplianceOfficers, Various Functional Managers (Risk Managers, Environmental Managers, Safety Managers, Fleet Managers, Property Managers, etc.) or Department Heads.

Country Classification—The country in which the customer is located will have an impact on perceived need and value. Countries such as Canada, Australia, New Zealand, Great Britain have regulatory requirements for corporate governance and risk management that work to highlight the need for better risk identification and a management system approach to risk controls. To a lesser extent in the United States the accounting profession, large stockholders and various legal and regulatory agencies are also highlighting the need for better risk identification and a management system approach to risk controls. Various tax structures may be present according to the country in which an individual company resides or operates that may severely affect the manner in which Economic Value Added can be calculated.

Furthermore, it is assumed that these aforementioned classifications will not be limiting of the possible organization or structure of the methodology or system according to the present invention. For instance, clients may desire that risk controls and management controls be classified by their duration (time it takes to implement a measure, short term versus long term strategies), labor requirements (labor intensive or not), etc. . . . It is therefore possible to further examine the needs of various market segments that are currently recognized by the customer and produce or identify additional needs that exist, but are not currently recognized by the customer.

The customer inherently values solutions that satisfy recognized needs. The present invention provides a useful tool to identify needs that were never even realized by a customer until the Economic Value Added of a decision is adequately explained and accepted.

Optimization of the Economic Value Added

Once accurate risk models and their associated risk and management control strategies have been applied/developed in the foregoing aspects of the present invention, one of the final steps is to determine if the risk model is actually ideal. The risk model approach once optimized for EVA answers the question of whether there is any value to a particular set of control activities using a recognized valuation methodology. It enables senior management to assure that scarce resources are only allocated in a fashion that provides optimal benefit for the entire organization.

Changes and comparisons can also be accomplished by further analyzing the effects of various models that may each come close to producing the same optimized Economic Value Added through more than one approach. The risk model and its associated risk and management controls can then be selected according to additional preferences such as available cash flows or scheduling requirements.

Optimizing the EVA™ of Risk Controls

The last critical element of the present invention includes completing the risk management method or system through the optimization of the economic value added by applying a variety of control efforts. This effort requires selecting a mix of management controls and risk controls that will maximize the reduction in the exposure with the minimum investment in cost and time. Optimization is complicated by the fact that separate controls are often interdependent with regard to their ability to reduce the risk exposure.

In order to proceed with a solution to this problem the present inventors have categorized the necessary controls as management risk controls (Mi) and specific risk controls (Sj), wherein the total set of risk controls (U) collectively includes both types.

Management risk controls (Mi) are those controls that are part of the risk management system and effect the whole universe of risk. These controls also influence the effectiveness of other controls that are targeted at specific risks. An example would be a safety audit program.

Specific risk controls (Sj) are those controls that are targeted at specific risks. These controls are dependent upon the management controls, but are independent of other risk controls. An example would be provision of lift tables to reduce the likelihood of back injury arising out of the lifting risk.

The present invention incorporates a methodology, system, and software for selecting a set of controls that optimizes the economic value added within a given budget. The methodology needs to be theoretically rigorous and practical in its application.

The present invention considers the master set of risk controls, U, that is applied to a set of risk exposures, $E^R$(e1, e2, e3, ... er), where r=the total number of risk exposures, associated with a set of risks R(r1, r2, r3, ... rq), where q=the total number of risks. The total exposure, $E_T$ is:

$$E_T = \Sigma er, \text{ where } 1 < r < q$$

Risk exposure er is defined as the product of the risk likelihood (i.e., the likelihood of the occurrence, for instance, 50% chance that worker will injure his/her back without proper load handling training) times the sum of the worst case severity for all consequence of that risk (i.e., $25,000 in worker's compensation and medical expenses).

Now the master set of risk controls U is separated into a set of management risk controls $M_i$ that operate (work to reduce) on the entire set of risk exposures, $E_{R_r}$. This set of management risk controls, $M_i$ ($m_1$, $m_2$, $M_3$, ... $m_n$), where n=the total number of management risk controls; and a set of specific risk controls that operate on a specific risk exposure, er, call it $S_j$ ($s_1$, $s_2$, $s_3$, ... $s_j$), j=the total number of risk controls. As aforementioned, the master set of risk controls U is defined by the sum of the sets of management risk and specific risk controls:

$$U = Mi + S_j$$

$M_i$ and $S_j$ are interdependent with regard to their ability to reduce $E_T$. In other words, specific risk controls are not fully effective without management risk controls. Management risk controls have limited impact without well thought out and implemented risk controls. For instance, management risk controls operate at two levels on the risk exposure. They have a small direct effect on the entire risk exposure, $E_T$. They also work to make the individual risk controls $s_j$ of each set of specific risk controls Sj, operate more efficiently.

The first effect on the risk exposure $E_T$ is $d_i$, which produces a reduction of the entire risk exposure $E_T$ and is quantified as a % reduction to be applied to $E_T$. The second effect on the risk exposure $x_i$, is measured and quantified as an effectiveness % to be multiplied times the 100% effective reduction %, $b_j$, of each individual risk controls, $s_j$, which are defined hereinafter. This effectiveness multiplier "$x_i$", or second effect on the risk exposure, $x_i$ is described in greater detail hereinafter.

There are two additional factors that the present inventors have incorporated into the present invention. In order to optimize the benefit obtained from a particular set of controls, the cost of the control ($c_i$) and the time necessary to implement the control ($t_i$) are considered. Note that in the preferred embodiment, $t_i$ is a measure of the time duration to complete the task and not a measure of the man-hour cost required to complete the task.

Therefore, the above additional factors collectively are represented by considering each management risk control to be defined by four parameters $M_i(d_i, x_i, c_i, t_i)$.

$M_i$=Management risk controls $d_i$=First Effect on Risk Exposure, ET, % reduction $x_i$=Second Effect on Risk Exposure, ET, % reduction (effectiveness multiplier, really varies the effectiveness of the risk control benefit, bj, of individual risk controls)

$c_i$=Individual Cost of the Control, $ $t_i$=Time Duration, time necessary to complete the task Specific risk controls, $S_j$, work at a single level on specific risk exposures, $e_r$. The benefit to be obtained by the risk control, $b_j$, is defined as a % reduction in exposure that could be obtained by the risk control, if it were 100% effective over the entire life of the control. For example, if the control works perfectly as designed one might expect a 50% reduction in the exposure. This risk control benefit "$b_j$" is the same benefit that is interdependent on the Second Effect on Risk Exposure, $x_i$ defined previously. As with management risk controls two other factors are important in evaluating the value of the control, cost ($\epsilon_j$) and time ($\tau_j$).

Accordingly, each specific risk control can therefore be defined by three parameters:

$$S_j (b_j, \epsilon_j, \tau_j).$$

For a particular subset of management risk controls, M($m_1$, $m_3$, $M_5$, ... $m_a$) and specific risk controls, S($s_2$, $s_5$, $s_6$, $s_9$, ... $s_n$) we can calculate the decrease in exposure, $\Delta E$, as follows:

$$\Delta E = [(d_1+d_3+d_5+ \ldots +d_a) \cdot E_T] + [(x_1+x_3+x_5+ \ldots +x_a) \cdot (b_2 \cdot e_2 + b_5 \cdot e_5 + b_6 \cdot e_6 + b_9 \cdot e_9 + \ldots + b_n \cdot e_n)]$$

Now note that three boundary conditions apply. (1) A management system cannot make an activity more than 100% effective, $\Sigma x_i \leq 1$; (2) A system cannot reduce the total exposure below zero, $\Delta E \leq E_T$; and (3) no matter how many risk controls one applies to a risk exposure, it cannot be reduced below zero:

(1) $\Sigma x_i \leq 1$, (2) $\Delta E \leq E_T$ (3) $(x_1+x_3+x_5+ \ldots +x_a) \cdot (b_1 \cdot e_m) \leq e_m$, wherein $b_1$ is the benefit parameter of the set of risk controls operating on a risk exposure "$e_m$."

The cost of the controls is therefore defined by:

$$\text{Cost} = (c_1 + c_3 + c_5 + \ldots + c_a) + (\epsilon_2 + \epsilon_5 + \epsilon_6 + \epsilon_9 + \ldots \epsilon_n)$$

Further, Cost is controlled by the following boundary condition:

$$\text{Cost} \leq \text{Control Budget}$$

As aforementioned, there were two different time parameters defined hereinabove, $t_i$ and $T_j$. The total time required to implement the controls is the controlling parameter or value of these two. In other words, the greatest value of $t_i$ or $T_j$ applies.

The application of this model in the present invention is an invaluable tool in efforts to solve the optimization problem and to incorporate EVA analysis into the model.

The first step is to specify for a particular set of risks, $R_p$, a set of potential management risk controls, $M_p$, and a set of potential specific risk controls, $S_p$. The above model assumes that management risk controls have an equal effect upon all specific risk controls and that a specific risk control is specific to a single risk. These assumptions will influence how management and specific risk controls are defined.

If one examines the equation for $\Delta E$, one can see that a system with no management controls has a $\Delta E = 0$, regardless of the number of risk controls that are in place. Since a situation where management has a complete lack of interest in risk exposures is rarely encountered, only three levels of basic non-systematic management control are defined (more or less can be added/removed as desired):

$m_1$=basic management interest, the minimum level of management involvement, where $d_1=0.01$ and $x_1=0.05$ $m_2$=average management interest, where $d_2=0.02$ and $x_2=0.15$ $m_3$=high management interest, where $d_3=0.03$ and $x_3=0.25$ Every set of management risk controls will include one of the above basic non-systematic management controls applied to the overall risk model. Note that at this point in time the values of $d_i$ and $x_i$ are arbitrary. They are only established to reflect that there is some basic value even in ad hoc management efforts. As desired by the operator applying the present invention, these values can be preset and remain unchanged for a particular organization or enterprise, and the operator can select the parameter or variable each time the present invention is applied.

Having listed out $M_p$ and $S_p$, the next step is to establish the values of the control parameters $d_i$, $x_i$, $c_i$, $t_i$, $b_i$, $\epsilon_n$, and $T_j$. Now the cost and time parameters are unique to each situation and must be established for each application. However, it would be helpful, and is included within the details of the present invention, that preset estimates or industry norms for these values can be utilized as baseline figures.

One of the means of implementing the present invention, involves the development of a computerized database(s) that capture the cost and time parameters along with such factors as would allow one to estimate the parameters for different situations. Included in the database are values of all of the various control parameters, with individual values of each parameter being associated with respective risk and management controls.

Initially, before the present invention has enjoyed the customization and ability to adapt and incorporate "real world" data and values of the various control parameters aforementioned, the nearly endless types of risk control and management control strategies that are presently applied in modern business systems along with their control parameters can be created and preset, baselined, or pre-established according to various market and industry classifications that might be available through corporate experiences, customer/client interview and surveys, etc. . . . These values and information can be utilized to develop a knowledge base, in the form of tables or computerized databases that lend themselves to editing and variation in accordance with client customization and changes in approach.

For example, the present inventors have pre-established by class of business the values of $d_i$, $x_i$ and $b_j$, so that the values have some statistical validity. This can be accomplished by surveys, customer feedback, accident reports, insurance claims, etc. across several organizations in a particularly market. In addition, the organizations applicable to the present invention are not limited to corporations or private endeavors, but can equally be applied to any organization, public or private, non-profit, governmental agencies, corporations, or small entity companies, etc. . . .

The present invention incorporates all of the aforementioned information, and applies it into a unique form of EVA analysis to further optimize the model(s). For example, the model as aforementioned is structured around percentage reductions in exposure. However, exposure is not defined with regard to its time span, i.e. the likelihood is not specified for a particular period of time. In estimating the exposures the present inventors apply consistent time periods for the defining the likelihood of success. In the following example and illustration of the EVA methodology of the present invention, an annual time span for the likelihood of success is used.

In order to maintain some practical simplicity in the following example, it is assumed that all factors involved in selecting a change in controls are constant over the time period that the investment is being evaluated over. However, with the benefit of computer-aided analysis, it will be obvious that the following methodology, even in it final form presented hereinafter, can be further expanded on to incorporate additional parameters, controls of varying time duration, and controls which associate cyclical trends as opposed to a single reduction in exposure (i.e., % reduction might vary from 19% to 45% over various time periods or might achieve a sinusoidal/cyclical responses).

In the following example, when evaluating a control improvement over a five-year period, then the exposures and control parameters will be held constant over the five-year period.

The safety improvement discussed hereinabove introduced portions of the methodology that is hereinafter developed in greater detail.

The $\Delta EVA$ for safety improvements is:

$$\Delta EVA^{IS} = \{(([AOE^P_{cs} - AOE^P_{is}] + [RC^P_{cs} - RC^P_{is}] - OE^S_{is}) \cdot (1-CTR)\} - [C^S_{is} \cdot C^*]$$

where $[AOE^P_{cs} - AOE^P_{is}]$ is the efficiency gain in the general productive system, $[RC^P_{cs} - RC^P_{is}]$ is the reduction in risk cost, $OE^S_{is}$, is the annual operating expense required for the safety improvement, CTR is the corporate tax rate, $C^S$ is the capital cost of the safety improvement and $C^*$ is the cost of capital rate, However, this equation can be generalized and applied for any set of risk improvements as follows:

$$\Delta EVA^{IR} = \{(([AOE^P_{cr} - AOE^P_{ir}] + [RC^P_{cr} - RC^P_{ir}] - OE^R_{ir}) \cdot (1-CTR)\} - [C^R_{ir} \cdot C^*]$$

Now for a management risk control $m_i$ being evaluated over y years $$C^R_{ir} = c_i \text{ and } OE^R_{ir} = c_i/y$$

Note that the management control cost must be set equal to the total operating expense and capital cost for the y period of years. Also note that y must be constant for all management and specific risk controls being considered. The reduction in risk cost is set equal to the reduction in total exposure.

$$[RC^P_{cr} - RC^P_{ir}] = d_i \cdot E_T$$

If the Corporate Tax Rate and the Cost of Capital are known (or simply supplied as default values), then the general equation becomes $$\Delta EVA^{IR} = \{(([AOE^P_{cr} - AOE^P_{ir}] + [d_i \cdot E_T] - c_i/y) \cdot (1-CTR)\} - [c_i \cdot C^*]$$

However, the current optimization model fails to account for any improvements in the efficiency of the general productive system, $[AOE^P_{cr} - AOE^P_{ir}]$. Therefore, a fifth parameter is added to the management risk controls, $\rho_i$, and a fourth parameter is added to the specific risk controls, $\theta_j$. Generally the effect on the general productive system efficiency will be negligible. However, both parameters are defined in terms of dollars saved per year.

Therefore, when considering each management risk control to be defined by five parameters $M_i$ $(\rho_i, d_i, c_i, t_i)$ and each specific risk control to be defined by four parameters $S_j$ $(\theta_j, b_j, \epsilon_j, T_j)$. In the revised model for a particular subset of management risk controls, M $(m_1, m_3, m_5, \ldots M_a)$ and specific risk controls, $S(s_2, s_5, s_6, s_9, \ldots s_n)$ we can define the total benefit $\Delta B$, as the general productivity gain $\Delta P$, plus the decrease in exposure $\Delta E$ as follows:

$$\Delta B = \Delta P + \Delta E, \text{ where}$$

$$\Delta E = [(d_1 + d_3 + d_5 + \ldots + d_a) \cdot E_T] + (x_1 + x_3 + x_5 + \ldots + x_a) \cdot (b_2 \cdot e_2 + b_5 \cdot e_5 + b_6 \cdot e_6 + b_9 \cdot e_9 + \ldots + b_n \cdot e_n)$$

and, $$\Delta P = (\rho_1 + \rho_3 + \rho_5 + \ldots + \rho_a) + (x_1 + x_3 + x_5 + \ldots + x_a) \cdot (\theta_2 + \theta_5 + \theta_6 + \theta_9 + \ldots + \theta_n)$$

Similarly, three boundary conditions still apply. Wherein, (1) A management system cannot make an activity more than 100% effective, $\Sigma x_i \leq 1$; (2) A system cannot reduce the total exposure below zero, $\Delta E \leq E_T$; and (3) no matter how many risk controls one applies to a risk exposure, it cannot be reduced below zero:

(1) $\Sigma x_i \leq 1$, (2) $\Delta E \leq E_T$ (3) $(x_1 + x_3 + x_5 + \ldots + x_j) \cdot (b_1 \cdot e_m) \leq e_m$, wherein $b_1$ is the benefit parameter of the set of risk controls operating on a risk exposure "$e_m$."

The cost of the controls remains unchanged and the total time required to implement the controls is still governed by the controlling time parameter, i.e., the greater value of $t_i$ or $T_j$. Accordingly, $$\text{Cost} = (c_1 + c_3 + c_5 + \ldots + c_a) + (\epsilon_2 + \epsilon_5 + \epsilon_6 + \epsilon_9 + \ldots \epsilon_n)$$

where, Cost s Control Budget

Returning to the calculation of $\Delta EVA^{IR}_m$ for a management risk control, $$\Delta EVA^{IR}_m = \{([AOE^P_{cr} - AOE^P_{ir}] + [d_i \cdot E_T] - c_i/y) \cdot (1-CTR)\}[c_i \cdot C^*]$$

where $[AOE^P_{cr} - AOE^P_{ir}] = \rho_i$ or $$\Delta EVA^{IR}_m = \{(\rho_i + [d_i \cdot E_T] - c_i/y) \cdot (1-CTR)\} - [c_i \cdot C^*]$$

Therefore, for an individual specific risk control sj being evaluated over y years, $$C^R_{ir} = \epsilon_j \text{ and } OE^R_{ir} = \epsilon_j/y$$

The reduction in risk cost is set equal to the reduction in exposure, so that $$RC^P_{cr} - RC^P_{ir} = (x_1 + x_3 + x_5 + \ldots + x_a) \cdot (b_j \cdot e_j)$$

$$[AOE^P_{cr} - AOE^P_{ir}] = (x_1 + x_3 + x_5 + \ldots + x_a) \cdot \theta_j$$

If given the Corporate Tax Rate and the Cost of Capital, then $$\Delta EVA^{IR}_m = \{(([(x_1 + x_3 + x_5 + \ldots + x_a) \cdot \theta] + [x_1 + x_3 + x_5 + \ldots + x_a) \cdot (b_j \cdot e_j)] - [\epsilon_j/y]) \cdot (1-CTR)\} - [\epsilon_j \cdot C^*]$$

Optimization of the EVA through Integration of Risk and Management Controls

An examination of the economic value added (EVA) of the above methodology, indicates that the EVA contribution of a risk control can only be evaluated in the context of the management risk controls that are in place or currently being implemented. In addition, the introduction of a new management risk control improves the effectiveness of not only new risk controls, but also the existing risk controls.

Therefore, the $\Delta^I EVA$ of the new set of management risk controls and specific risk controls being proposed as part of a risk improvement can only be calculated by comparing the $\Delta EVA$ of the current set of controls to the $\Delta EVA$ of the current set plus the new controls.

The total $\Delta EVA^{CR}_T$ for the current set of controls is equal to the sum of $\Delta EVA^{CR}_m$ for all current management risk controls and $\Delta EVA^{CR}_c$ for all current specific risk controls.

The total $\Delta EVA^{IR}_c$ for a risk improvement for all risk controls after implementation of the new controls becomes (in simplified form):

$$\Delta^I EVA = \Delta EVA^{IR}_T - \Delta EVA^{CR}_T$$

Applying this principle to a current (initial set of management risk controls) set of management controls $M_c(m_2, m_5, m_6)$ and a current set of specific risk controls, $S_c(s_1, s_3, s_4, s_5)$ and a proposed improved set of management risk controls, $M^I(m_3, m_4, m_5, m_6, m_7, m_8)^{it}$ and an improved set of specific risk controls, $S^I(s_1, s_3, s_4, s_5, s_6, s_7, s_8, s_9)$, then the equation becomes:

$$\Delta^I EVA = [\{\{([\rho_3 + \rho_4 + \rho_5 + \rho_6 + \rho_7 + \rho_8] +$$
$$[(d_3 + d_4 + d_5 + d_6 + d_7 + d_8) \cdot E_T] -$$
$$[(c_3 + c_4 + c_5 + c_6 + c_7 + c_8)/y]) \cdot (1 - CTR)\} -$$
$$[(c_3 + c_4 + c_5 + c_6 + c_7 + c_8) \cdot C^*]\}_m +$$
$$\{\{([x_3 + x_4 + x_5 + x_6 + x_7 + x_8) \cdot$$
$$(\theta_1 + \theta_3 + \theta_4 + \theta_5 + \theta_6 + \theta_7 + \theta_8 + \theta_9)] +$$
$$[(x_3 + x_4 + x_5 + x_6 + x_7 + x_8) \cdot$$
$$(b_1 \cdot e_1 + b_3 \cdot e_3 + b_4 \cdot e_4 + b_5 \cdot e_5 + b_6 \cdot e_6 + b_7 \cdot$$
$$e_7 + b_8 \cdot e_8 + b_9 \cdot e_9)] -$$
$$[(\epsilon_1 + \epsilon_3 + \epsilon_4 + \epsilon_5 + \epsilon_6 + \epsilon_7 + \epsilon_8 + \epsilon_9)/y] \cdot (1 - CTR)\} -$$
$$[(\epsilon_1 + \epsilon_3 + \epsilon_4 + \epsilon_5 + \epsilon_6 + \epsilon_7 + \epsilon_8 + \epsilon_9) \cdot C^*]\}_{Imp} -$$
$$[\{\{([\rho_2 + \rho_5 + \rho_6] + [(d_2 + d_5 + d_6) \cdot E_T] -$$
$$[(c_2 + c_5 + c_6)/y]) \cdot (1 - CTR)\} - [(c_2 + c_5 + c_6) \cdot$$
$$C^*]\}_m + \{\{([x_3 + x_4 + x_5 + x_6 + x_7 + x_8) \cdot$$

-continued
$$(\theta_1 + \theta_3 + \theta_4 + \theta_5 + \theta_6 + \theta_7 + \theta_8 + \theta_9)] +$$
$$[(x_3 + x_4 + x_5 + x_6 + x_7 + x_8) \cdot$$
$$(b_1 \cdot e_1 + b_3 \cdot e_3 + b_4 \cdot e_4 + b_5 \cdot e_5 + b_6 \cdot e_6 + b_7 \cdot e_7 + b_8 \cdot$$
$$e_8 + b_9 \cdot e_9)] - [(\varepsilon_1 + \varepsilon_3 + \varepsilon_4 + \varepsilon_5 + \varepsilon_6 + \varepsilon_7 + \varepsilon_8$$
$$+\varepsilon_9)/y] \cdot (1 - CTR)\}[(\varepsilon_1 + \varepsilon_3 + \varepsilon_4 + \varepsilon_5 + \varepsilon_6 + \varepsilon_7 +$$
$$\varepsilon_8 + \varepsilon_9) \cdot C^*]\}_c]_{Cur}$$

where, Imp designates the Improved set of controls and Cur designates the Current set of controls This equation can be further generalized and applied to calculate the change in EVA of a proposed improvement, $\Delta\,'EVA$, as $$\Delta'EVA = [\{\{([\sum \rho_i]^I + [(\sum d_i)^I \cdot E_T] - [(\sum c_i)^I/y]) \cdot$$
$$(1 - CTR)\} - [(\sum c_i)^I \cdot C^*]\}_m +$$
$$\{\{([\sum x_i)^I \cdot (\sum \theta_i)^I] + [(\sum x_i)^I \cdot (\sum b_j \cdot e_j)^I] -$$
$$[(\sum \varepsilon'_j)/y]) \cdot (1 - CTR)\} - [(\sum \varepsilon'_j) \cdot C^*]\}_c]_{Imp} -$$
$$[\{\{([\sum \rho_i]^C + [(\sum d_i)^C \cdot E_T] - [(\sum c_i)^C/y]) \cdot$$
$$(1 - CTR)\} - [(\sum c_i)^C \cdot C^*]\}_m +$$
$$\{\{([\sum x_i)^C \cdot (\sum \theta_i)^C] + [(\sum x_i)^C \cdot (\sum b_j \cdot e_j)^C] -$$
$$[(\sum \varepsilon^C_j)/y]) \cdot (1 - CTR)\} - [(\sum \varepsilon^C_j) \cdot C^*]\}_c]_{Cur}$$

Accordingly, the present inventors have succeeded in expressing the $\Delta\,'EVA$ in terms of the risk exposure, a set of control parameters, the control budget, the corporate tax rate and the cost of capital rate. The optimal set of controls is that set having the greatest $\Delta\,'EVA$.

The present invention therefore relies on the creation, storage, reuse, and modification of risk and management controls in order to create a knowledge base for risk models. Table I and Table II demonstrate sample applications of the aforementioned methodology wherein Management Risk and Specific Risk Controls are defined along with their respective control parameters.

A system according to one preferred embodiment of the present invention would include a computerized database for storing and editing risk models, wherein the risk models are classified by industry type, organizational structure, and functional segments within each industry type. Additional classifications can be incorporated into the knowledge base. For instance, the risk models can be developed and classified according to their respective countries. For instance, a company or organization operating within countries that belong to the European Union may be subject to unique codes, tax rates, management/risk control sets, etc.

TABLE I

MANAGEMENT CONTROLS

| | Management Control | Dependency | $\rho_i$/unit Production Efficiency Factor | $\rho_i$-unit | $d_i$ Direct Exposure Reduction | $x_i$ Mgmt Efficiency Factor | $c_i$-unit Cost | $c_i$-unit | $t_i$ Time |
|---|---|---|---|---|---|---|---|---|---|
| $m_1$ | Basic Non-Systematic Management | | $0 | | .01 | .05 | $0 | | 0 wks |
| $m_2$ | Average Non-Systematic Management | | $0 | | .02 | .15 | $0 | | 0 wks |
| $m_3$ | Good Non-Systematic Management | | $0 | | .03 | .25 | $0 | | 0 wks |
| $m_4$ | Form Risk Steering Group | | $10,000 | Business Unit | .10 | .15 | $2,000 | member | 4 wks |
| $m_5$ | Appoint Risk Manager | | $0 | | .05 | .25 | $50,000 | billion sales | 16 wks |
| $m_6$ | Define Operational Performance Standards | | $0 | | .05 | .25 | $25,000 | billion sales | 26 wks |
| $m_7$ | Distribute Responsibility for Performance | | $1,000 | Business Unit | .05 | .20 | $10,000 | billion sales | 4 wks |
| $m_8$ | Establish Risk Prioritization System | | $0 | | .05 | .05 | $10,000 | billion sales | 12 wks |
| $m_9$ | Establish Risk Identification Procedure | | $0 | | .10 | .00 | $10,000 | billion sales | 26 wks |
| $m_{10}$ | Audit Compliance with Performance Standards | m6 | $0 | | .05 | .25 | $50,000 | billion sales | 52 wks |
| $m_{11}$ | Establish Exposure Based Cost Allocation | | $0 | | .05 | .15 | $10,000 | billion sales | 16 wks |
| $m_1$ | Additional Management Controls | | $ | unknown | unknown | unknown | unknown | unknown | unknown |

TABLE II

RISK CONTROLS

| | Risk Control | Risk | $\theta_i$/unit Production Efficiency Increase | $\theta_i$-unit | $b_i$ % Exposure Reduction Factor | $\epsilon_i$/unit Cost | $\epsilon_i$-unit | $T_i$ Time |
|---|---|---|---|---|---|---|---|---|
| $s_1$ | Provide Machine Guards | r1 | $0 | | .9 | $150 | machine | 4 wks |
| $s_2$ | Provide Fall Protection | r2 | $0 | | .9 | $25 | situation | 4 wks |

TABLE II-continued

RISK CONTROLS

| | Risk Control | Risk | $\theta_i$/unit Production Efficiency Increase | $\theta_i$-unit | $b_i$ % Exposure Reduction Factor | $\epsilon_i$/unit Cost | $\epsilon_i$-unit | $T_i$ Time |
|---|---|---|---|---|---|---|---|---|
| $s_3$ | Provide Lift Tables | r3 | $200 | table | .75 | $200 | table | 8 wks |
| $s_4$ | Supervisors Perform Weekly Hazard Inspection | r4 | $0 | | .3 | $1,250 | supervisor | 4 wks |
| $s_5$ | Label Hazardous Materials | r5 | $0 | | .1 | $1,000 | plant | 16 wks |
| $s_6$ | Lock out/tag out program | r6 | $0 | | .8 | $250 | machine | 8 wks |
| $s_7$ | Train Employees in correct lifting procedure | r3 | $100 | employee | .5 | $1 | employee | 16 wks |
| $s_i$ | Additional Risk Controls | ri | $ | | unknown | $ | unknown | unknown |

As seen in the foregoing Tables (I–II), any risk model can be built by selecting pre-selected risk and management controls. However, if the knowledge base is inadequate for a particular task, the database should be fully capable of allowing an operator to manipulate existing controls and to add/edit additional controls (risk or management). Furthermore, the same risk control may have different parameters for separate organizations or functional segments. Accordingly, an operator may wish to simply adjust the values associated with a pre-existing risk or management control.

As further seen in the accompanying Tables, the exposures associated with each risk are also defined within the computerized database. If possible, a baseline of unit exposures that can be extended against some scaling factor may be used initially. As the operator learns more about a particular client or industry, then the specific parameters associated with each control can be further optimized.

Figure 4:
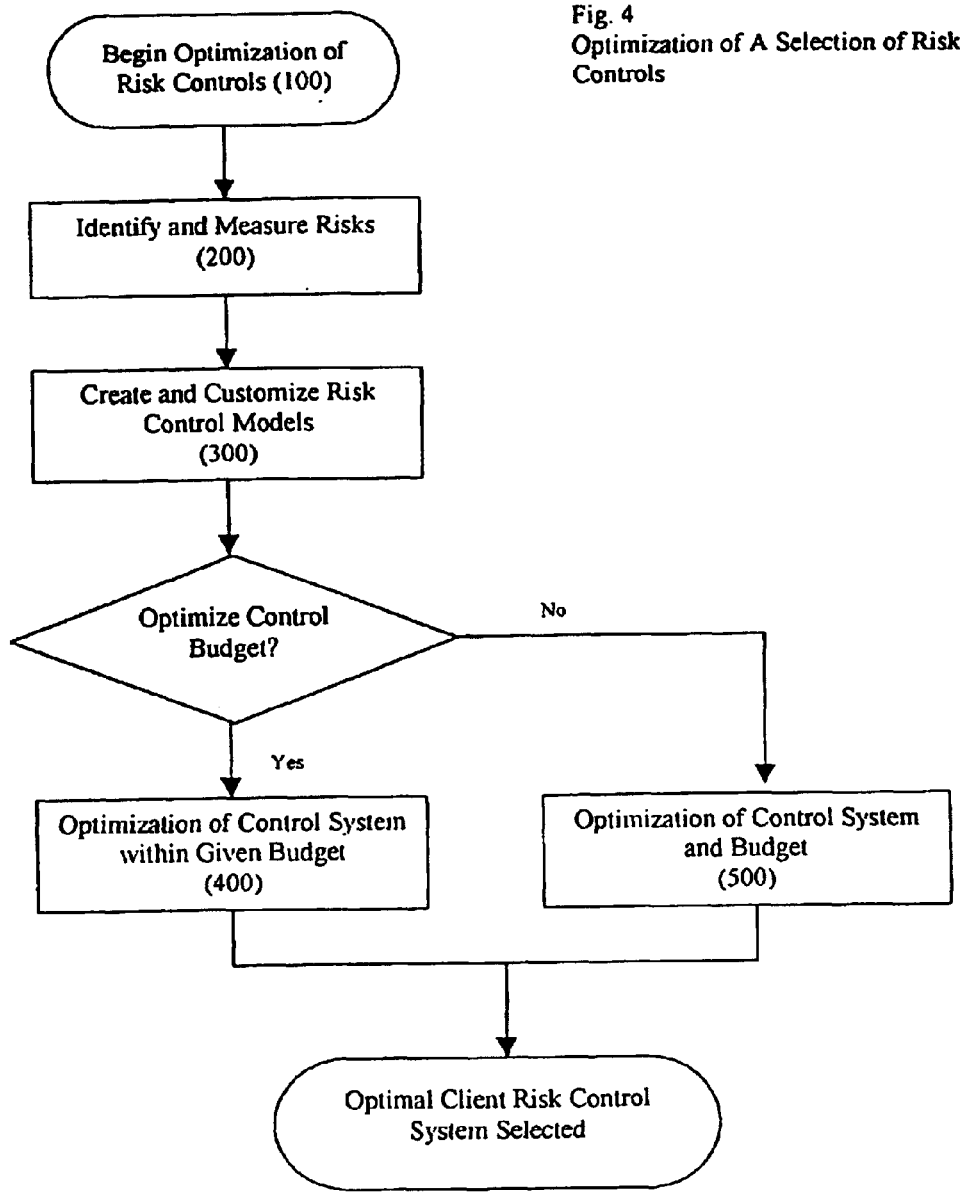
FIG. 4 is a flow chart of a methodology according to an embodiment of the present invention.
Figure 5:
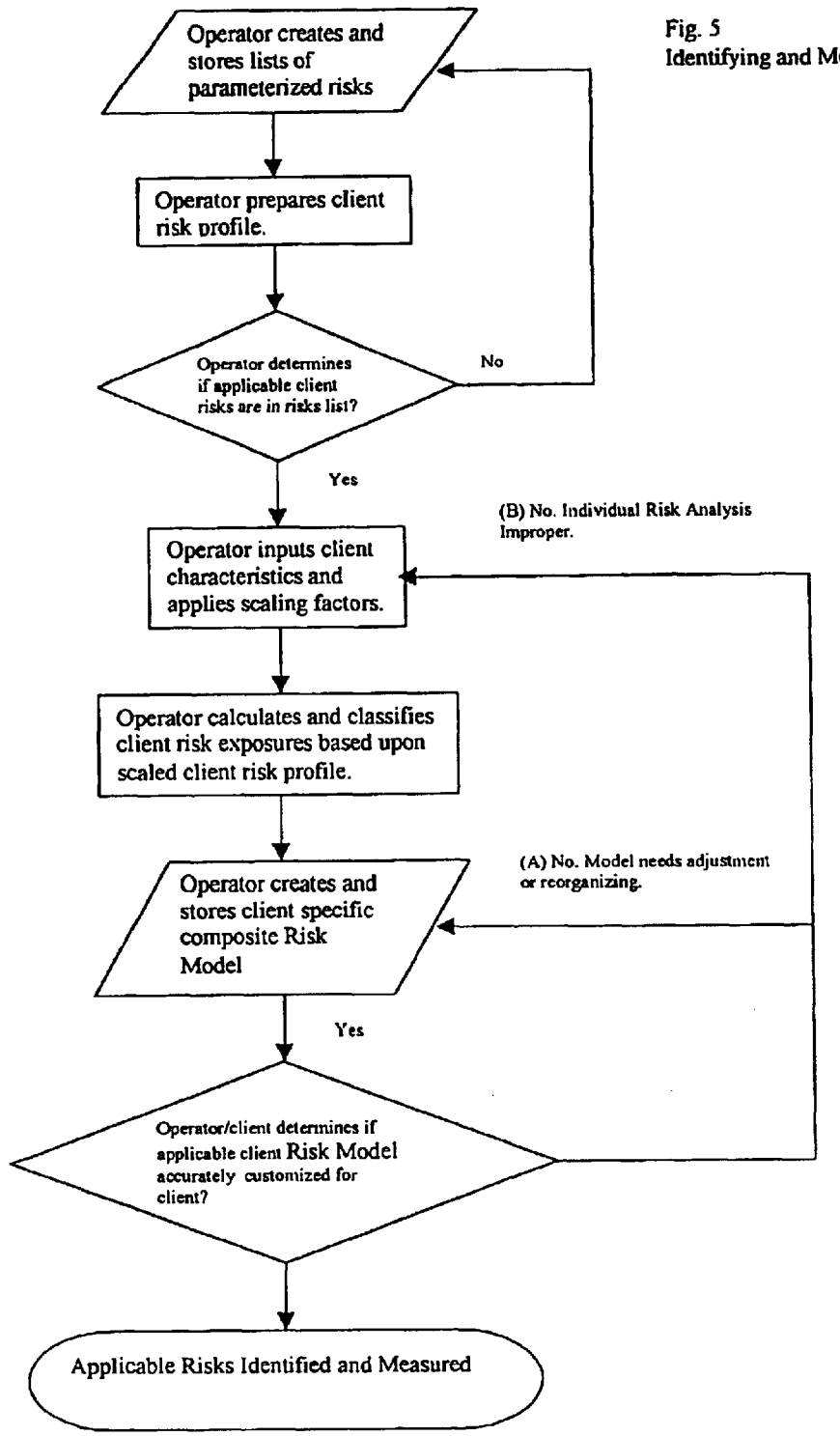
FIG. 5 is a flow chart of a portion of the methodology shown in FIG. 4.
Figure 6:
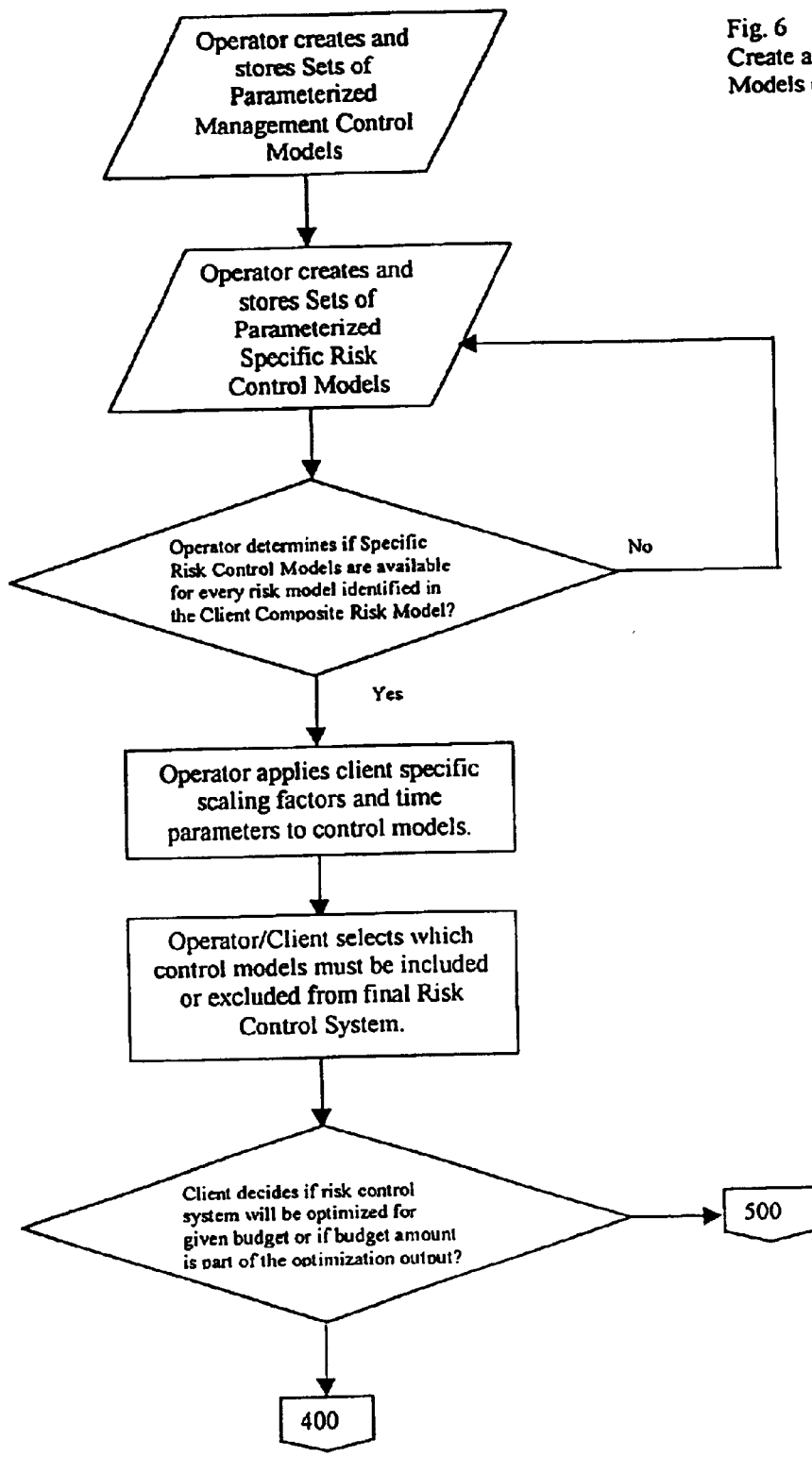
FIG. 6 is a flow chart of a portion of the methodology shown in FIG. 4.
Figure 7:
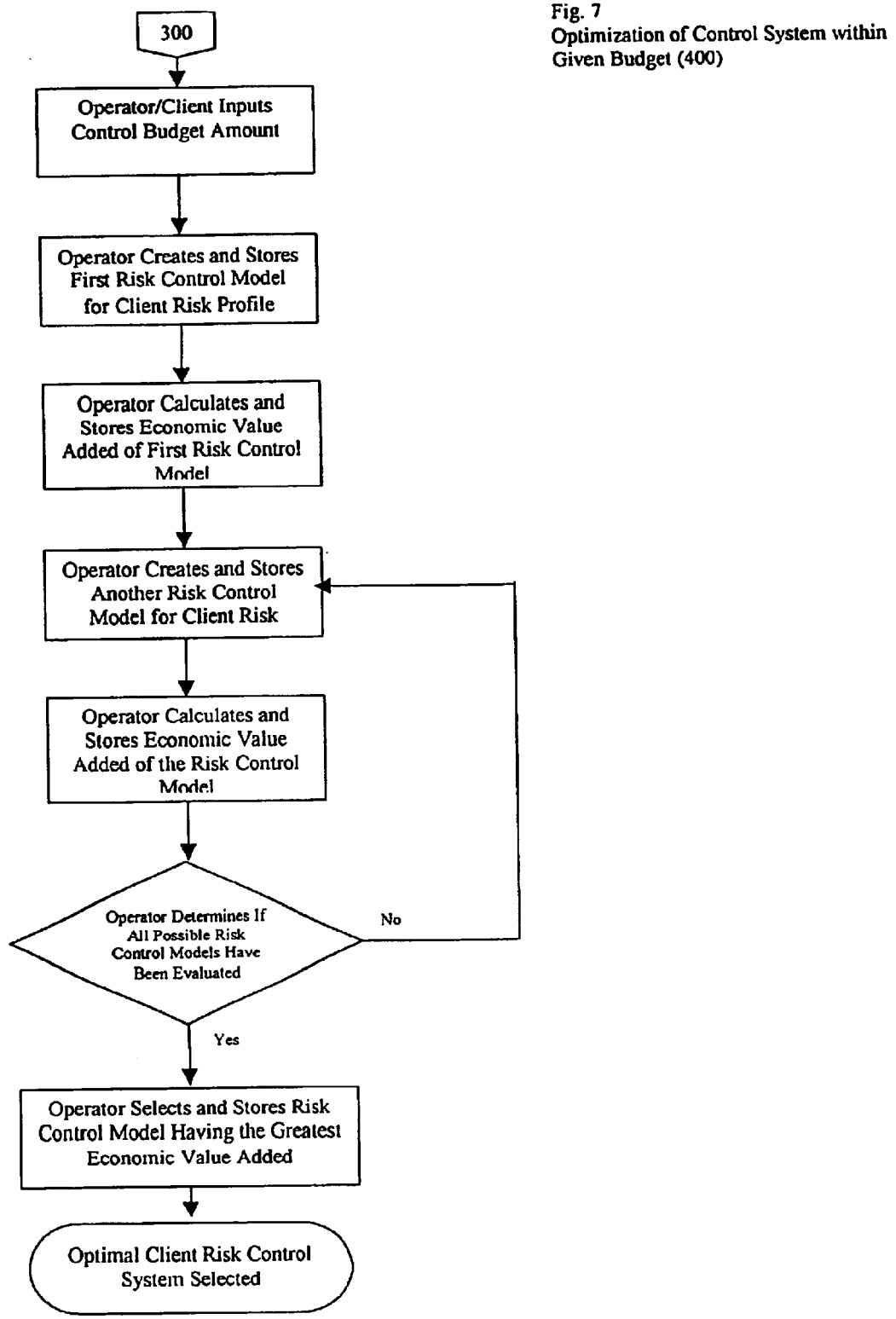
FIG. 7 is a flow chart of a portion of the methodology shown in FIG. 4.
Figure 8:
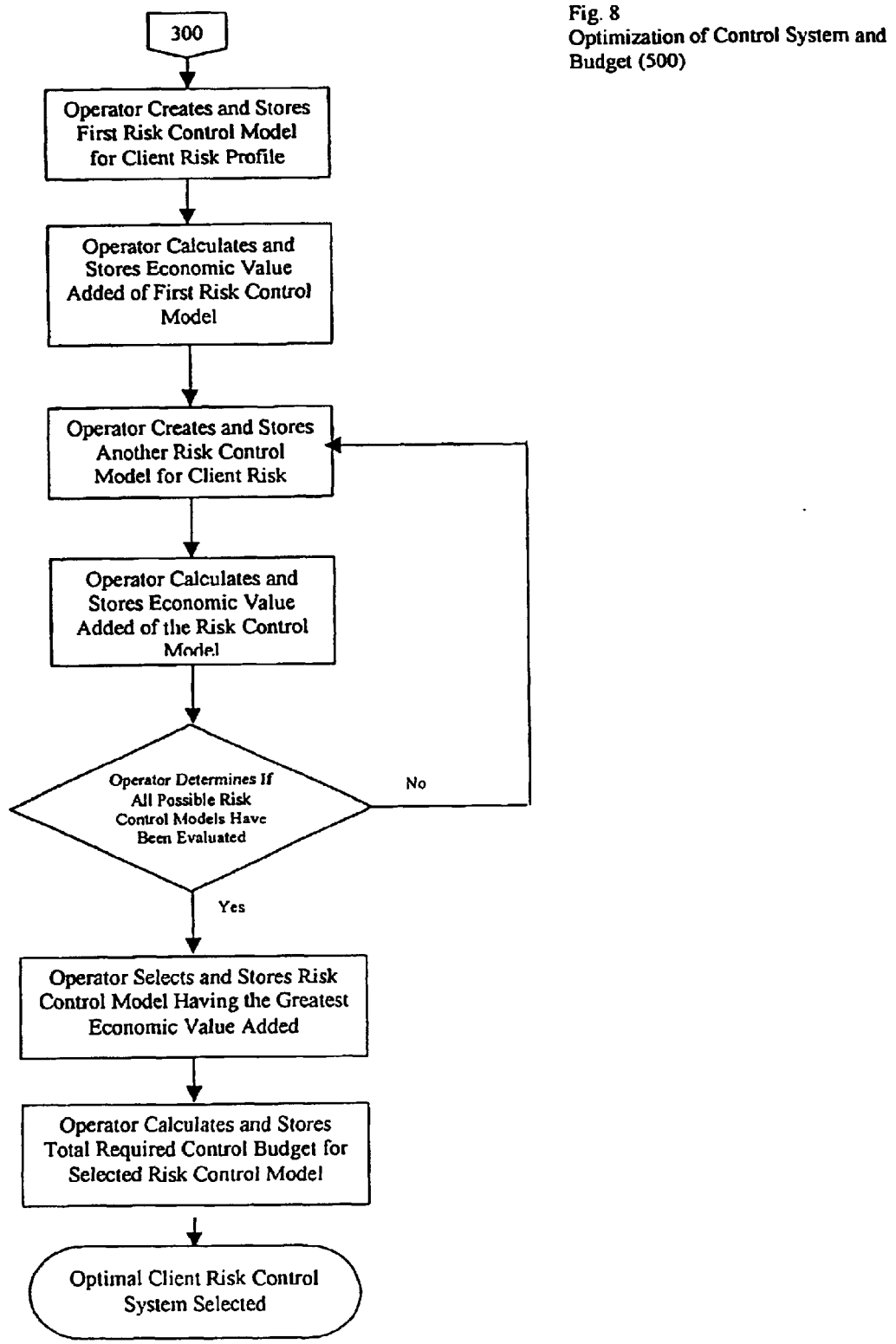
FIG. 8 is a flow chart of a portion of the methodology shown in FIG. 4.

FIG. 4 shows a flow chart of a methodology according to an embodiment of the present invention. FIG. 5 shows a flow chart of a portion of the methodology shown in FIG. 4. FIG. 6 shows a flow chart of a portion of the methodology shown in FIG. 4. FIG. 7 shows a flow chart of a portion of the methodology shown in FIG. 4. FIG. 8 shows a flow chart of a portion of the methodology shown in FIG. 4.

As seen generally in FIG. 4, one embodiment of the present invention is shown that incorporates several steps in the process of defining an optimal client risk control system. When the process of optimization of a set of risk control begins (100), the first step required is to identify and measure applicable client risks (200), then to create and customize risk control models (300) based on the client risks identified in the previous step (200). The client's control budget is then optimized by one of two approaches: optimization of a control system within a given budget (400) or optimization of a control system and budget (500). Upon completion of either of these approaches, the optimal client risk control system can then be selected. The individual portions of the methodology according to an embodiment of the present invention will be described hereinafter with reference to the accompanying figures.

As seen in FIG. 5, identification and measuring of risks applicable to each client can involve several complicated and detailed steps. In order to create an applicable, client-specific risk profile, the operator must create and store lists of parameterized risks that are applicable to a particular client. If current risks already stored within a given knowledge base satisfy the client's' objectives and/or characteristics, this step is reduced to a simpler process of simply extracting those risks that are predefined. However, it is more likely that a client's objectives will require the operator of the present invention to create and store lists of parameterized risks based on the client's individual characteristics.

For instance, factors considered in modeling client risk profiles may include the industry type, organizational structure, organizational/client objectives and functional segments within each industry type. The operator at this point in the process may find it advantageous to ensure that a corresponding risk has been identified for each of the client's objectives. If a risk has not been identified, then it is more likely than not that the operator/client still needs to identify the risk associated with the client objective.

Once an operator determines that all of the applicable risks have been identified and measured, the operator inputs client characteristics and applies appropriate scaling factors. Tables I and II of the present application, help to demonstrate some of the applicable management risk and specific risk controls and their associated parameters and characteristics. The operator can then calculate and classify a client's risk exposures (for each identified risk in the client risk profile) based upon the scaled client risk profile just created.

Accordingly, the operator can then create and store client specific risk models. For a specific client, the operator has identified and measured all of the applicable client-specific risks once a client composite risk model (201) has been created and stored that requires no further adjustment and incorporates all of the actual risks affecting an individual client.

Once the client composite risk model (201) has been created (objective of step 200), the operator must create and customize all corresponding risk controls that work to reduce a client's risk exposures. As seen in more detail in FIG. 6 and discussed hereinabove, the risk control models are created from parameterized sets of Management Risk Controls ($M_i$) and Specific Risk Controls ($S_j$). In this step (300), the operator must create and store sets of both types of risk controls in order to create the master set of risk controls (U).

This involves creating and storing (if not already in the knowledge base or database) sets of parameterized Management Risk Control Models ($M_i$) and Specific Risk Control Models ($S_j$) for every risk model identified in the Client Composite Risk Model (201) created in the previous step (200). The operator then applies client specific scaling factors and time parameters to the control models [ for instance, $M_i(\rho_i, d_i, x_i, c_i, t_i)$ and $S_j(\theta_j, b_j, \epsilon_j, T_j)$].

The operator and/or client can then select and determine which control models must be included or excluded from the final Risk Control System (301). This is accomplished by at least one of the two processes shown in more detail in FIG. 7 (400) and FIG. 8 (500). At this branch in the inventive process, the operator must determine if the client wishes to optimize the final Risk Control System (301) for a given budget (400) or if the budget amount is part of the optimization output (500).

As seen in FIG. 7, the control budget amount may already be preset or limited for the client. In this case, the operator creates and stores a first Risk Control Model (302) for the Client Composite Risk Model (201). The operator then can calculate and store the economic value added of the first Risk Control Model (302). The operator can then create a comparative/additional (i.e, different than the first model 302) Risk Control Model (303) for the client risk. This allows the operator to calculate and store the economic value added of additional (as many as desired by the client/operator) risk control models incorporating various control strategies, emphasizing one client objective over another, etc. . . . The operator ensures that all of the additional and comparative Risk Control Models (302, 303) have been evaluated and the client/operator is thereby well suited to select the final Risk Control System (301) that produces the greatest economic value added. This comparative process has been already discussed in a preferred embodiment hereinabove (See Optimization the EVA through Integration of Risk and Management Controls).

Alternatively, the client/operator may have the advantage of being able to first select the final Risk Control System (301) and then allocate funding for its implementation. One of ordinary skill in the art will appreciate that the alternative process defined in FIG. 8 (500) is very similar to that shown in FIG. 7 (400), with the exception of the point in the process where the control budget is introduced. Optimization of the Control System and the budget is accomplished in the second approach (500). In the first approach, the operator is working within a predefined budget.

In addition, the present invention will incorporate a computer-based data processing system to enable an operator to create the final risk control system providing a maximum economic value, wherein the system will comprise a means for storing risk models, wherein the risk models include risks and corresponding risk exposures. The system must include means for storing specific risk control models and means for storing management risk control models further classified and arranged by at least industry type, organizational structure, and functional segments within each industry type. The system should further include means for developing risk control systems by combining the specific risk and management risk controls into at least one client specific risk control system.

The various means for implementing the aforementioned computerized data processing system can incorporate a series of electronic databases or a single database that incorporates all of the information into a large tabular format, with the fields permitting characterization of the data into risk models, specific risk controls and management risk controls. One of ordinary skill in the art will appreciate that a standalone system can be created using known programming languages (i.e., Dbase) and database software or the data processing system can incorporate links to or operate within one of several known operating systems or software suites (i.e., MS Access, MS Office, etc. . . . ).

In addition, the system must incorporate a means for determining the optimum risk control system by calculating the Economic Value Added (EVA) of each client specific risk control system so that said operator can select the optimum risk control system that demonstrates a maximum Economic Value Added (EVA). This can be accomplished by any known computer aided mathematical analysis, stored functions within a database structure, or dedicated microprocessor.

In addition, it is a feature of the present invention that a processor-readable article of manufacture be utilized to store the method of the present invention. This can be a program having embodied thereon software comprising a plurality of code segments that implements the method of any one or all of the steps defined by FIGS. 4–8, in order to enable an operator to optimize a selection of risk controls based upon maximizing the economic value added within a given risk control budget, wherein The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for optimizing a selection of risk controls based upon maximizing the economic value added within a client's given risk control budget, wherein said method comprises the following steps:

identifying and measuring risks;

creating at least one risk control system based upon said risks;

determining the economic value added of each risk control system; and selecting an optimal risk control system that has a maximum economic value added based upon the determining step.

2. The method according to claim 1, wherein the step of identifying and measuring risks further includes the steps of creating and storing lists of parameterized risks; and preparing a client risk profile, said client risk profile including said lists of parameterized risk that are applicable to said client.

3. The method according to claim 2, wherein said lists of parameterized risks are classified and arranged by at least industry type, organizational structure, organizational objective, and functional segments within each industry type.

4. The method according to claim 3, wherein the step of identifying and measuring risks further includes the steps of inputting client characteristics and applying scaling factors to said client risk profile; and measuring said risks based upon each risk's exposure.

5. The method according to claim 4, wherein said risk exposures are estimated from an analysis of loss distribution functions of each risk.

6. The method according to claim 5, wherein the step of identifying and measuring risks further includes the steps of creating and storing parameterized models of the risk exposure of said risks, wherein said parameterized models are scaleable based upon various exposure units; and creating and storing a client composite risk model based upon said parameterized models of the risk exposure of said risks, wherein said client composite risk model incorporates all of said risks affecting said client.

7. The method according to claim 6, wherein the client composite risk model is based upon client specific characteristics of at least industry type, organizational structure, organizational objectives and functional segment within each industry type.

8. The method according to claim 7, further including the step of calculating a total risk exposure, $E_T$, for said client composite risk model.

9. The method according to claim 8, wherein the step of creating at least one risk control system further includes the steps of creating and storing sets of parameterized management risk control models for said risks;

creating and storing sets of parameterized specific risk control models for said risks; and combining said sets of parameterized management risk and specific risk control models into at least one risk control system.

10. The method according to claim 9, wherein said final risk control system includes sets of parameterized management risk and specific risk control models for each risk model included in said client composite risk model.

11. The method according to claim 10, each parameterized set of management risk controls, $M_i$, includes parameter values, said parameter values include a production efficiency value, $\rho_i$, stated per a pre-defined unit characteristic of the client for the production efficiency value, $\rho_i$-unit, a direct exposure reduction factor, $d_i$;

a management efficiency factor, $x_i$;

a cost factor, $c_i$, state per a pre-defined unit characteristic of the client for the cost factor, $c_i$-unit; and a time interval, $t_i$, required to implement each management risk control, $m_i$.

12. The method according to claim 10, each parameterized set of specific risk controls, $S_j$, includes parameter values, said parameter values include a production efficiency factor, $\theta_j$, stated per a pre-defined unit characteristic of the client for the production efficiency value, $\theta_j$-unit;

a percent reduction in exposure, $b_j$, obtained by each specific risk control, $s_j$, if said risk control operates correctly over an entire life of each risk control;

a cost factor, $\epsilon_j$, stated per a pre-defined unit characteristic of the client for the cost factor, $\epsilon_j$-unit; and a time interval, $m_j$, required to implement each specific risk control.

13. The method according to claim 12, each parameterized set of specific risk controls, $S_j$, includes parameter values, said parameter values include a production efficiency factor, $\theta_j$, stated per a pre-defined unit characteristic of the client for the production efficiency value, $\theta_j$-unit;

a percent reduction in exposure, $b_j$, obtained by each specific risk control, $s_j$, if said risk control operates correctly over an entire life of each risk control;

a cost factor, $\epsilon_j$, stated per a pre-defined unit characteristic of the client for the cost factor, $\epsilon_j$-unit; and a time interval, $m_j$, required to implement each specific risk control.

14. The method according to claim 13, wherein the step of determining the economic value added of each risk control system, further includes the steps of calculating the economic value added of each risk control system with an algorithm which incorporates the parameters associated with said sets of management risk and specific risk controls; and selecting a final risk control system that generates a maximum value of the economic value added.

15. The method according to claim 14, wherein said algorithm is used to generate the economic value added, $\Delta^I EVA$, between an improved (Imp) risk control system and a current (Cur) risk control system, and where CTR is a corporate tax rate, $C^*$ is a cost of capital, m indicates a management control, c indicates a specific risk control, and y is years, said algorithm is defined as follows:

$$\Delta^I EVA = [\{\{([\sum \rho_i]^I + [(\sum d_i)^I \cdot E_T] - [(\sum c_i)^I / y]) \cdot$$
$$(1 - CTR)\} - [(\sum c_i)^I \cdot C^*]\}m +$$
$$\{\{([\sum x_i)^I \cdot (\sum \theta_i)^I] + [(\sum x_i)^I \cdot (\sum b_j \cdot e_j)^I] -$$
$$[(\sum \epsilon_j^I)/y]) \cdot (1 - CTR)\} - [(\sum \epsilon_j^I) \cdot C^*]\}c]_{Imp} -$$

-continued
$$[\{\{([\sum \rho_i]^C + [(\sum d_i)^C \cdot E_T] - [(\sum c_i)^C / y]) \cdot$$
$$(1 - CTR)\} - [(\sum c_i)^C \cdot C^*]\}m +$$
$$\{\{([\sum x_i)^C \cdot (\sum \theta_i)^C] + [(\sum x_i)^C \cdot (\sum b_j \cdot e_j)^C] -$$
$$[(\sum \epsilon_j^C)/y]) \cdot [1 - CTR\} - [(\sum \epsilon_j^C) \cdot C^*]\}c]_{Cur}.$$

16. The method according to claim 2, wherein the step of identifying and measuring risks further includes the steps of inputting client characteristics and applying scaling factors to said client risk profile; and measuring said risks based upon each risk's exposure.

17. The method according to claim 16, wherein said risk exposures are estimated from an analysis of loss distribution functions of each risk.

18. The method according to claim 16, wherein the step of identifying and measuring risks further includes the steps of creating and storing parameterized models of the risk exposure of said risks, wherein said parameterized models are scaleable based upon various exposure units; and creating and storing a client composite risk model based upon said parameterized models of the risk exposure of said risks, wherein said client composite risk model incorporates all of said risks affecting said client.

19. The method according to claim 1, wherein the step of creating at least one risk control system further includes the steps of creating and storing sets of parameterized management risk control models for said risks;

creating and storing sets of parameterized specific risk control models for said risks; and combining said sets of parameterized management risk and specific risk control models into at least one risk control system.

20. The method according to claim 19, each parameterized set of management risk controls, $M_i$, includes parameter values, said parameter values include a production efficiency value, $\rho_i$, stated per a pre-defined unit characteristic of the client for the production efficiency value, $\rho_i$-unit;

a direct exposure reduction factor, $d_i$;

a management efficiency factor, $x_i$;

a cost factor, $c_i$, state per a pre-defined unit characteristic of the client for the cost factor, $c_i$-unit; and a time interval, $t_i$, required to implement each management risk control, $m_i$.

21. The method according to claim 19, each parameterized set of specific risk controls, $S_j$, includes parameter values, said parameter values include a production efficiency factor, $\theta_j$, stated per a pre-defined unit characteristic of the client for the production efficiency value, $\theta_j$-unit;

a percent reduction in exposure, $b_j$, obtained by each specific risk control, $s_j$, if said risk control operates correctly over an entire life of each risk control;

a cost factor, $\epsilon_j$, stated per a pre-defined unit characteristic of the client for the cost factor, $\epsilon_j$-unit; and a time interval, $m_j$, required to implement each specific risk control.

22. A processor-readable article of manufacture having embodied thereon software comprising a plurality of code segments that implements the method of claim 1, in order to enable an operator to optimize a selection of specific risk controls and management risk controls into a final risk control system designed to maximize the economic value added within a client's given risk control budget.

23. A computer-based data processing system to enable an operator to create a risk control system providing a maximum economic value, wherein said system comprises:

- means for storing risk models, wherein said risk models include risks and corresponding risk exposures;
- means for storing specific risk control models further classified and arranged by at least industry type, organizational structure, and functional segments within each industry type;
- means for storing management risk control models further classified and arranged by at least industry type, organizational structure, and functional segments within each industry type;
- means for developing risk control systems by combining said specific risk and management risk controls into at least one client specific risk control system; and
- means for determining an optimum risk control system by calculating an Economic Value Added (EVA) of each client specific risk control system so that said operator can select the optimum risk control system that demonstrates a maximum Economic Value Added (EVA).

24. The system according to claim 23, wherein said means for determining an optimum risk control system is a computerized device capable of processing mathematical algorithms.

* * * * *